A. SAUR & J. WILSON.
HARROW CULTIVATOR.

No. 189,792. Patented April 17, 1877.

WITNESSES
Franck L. Ourand
Frank Galt

INVENTOR
Anton Saur
John Wilson
Alexander Iverson
ATTORNEYS.

UNITED STATES PATENT OFFICE.

ANTON SAUR AND JOHN WILSON, OF FRANKLIN, INDIANA.

IMPROVEMENT IN HARROW-CULTIVATORS.

Specification forming part of Letters Patent No. 189,792, dated April 17, 1877; application filed February 19, 1877.

*To all whom it may concern:*

Be it known that we, ANTON SAUR and JOHN WILSON, of Franklin, in the county of Johnson, and in the State of Indiana, have invented certain new and useful Improvements in Harrow-Cultivators; and do hereby declare that the following is a full, clear, and exact description thereof, reference being had to the accompanying drawings, and to the letters of reference marked thereon, making a part of this specification.

The nature of our invention consists in the construction and arrangement of the several parts of a harrow and pulverizer for land, the peculiarities of which will be hereinafter more fully described.

To enable those skilled in the art to make and to use our invention we will now proceed to describe its construction and operation.

Figure 1:
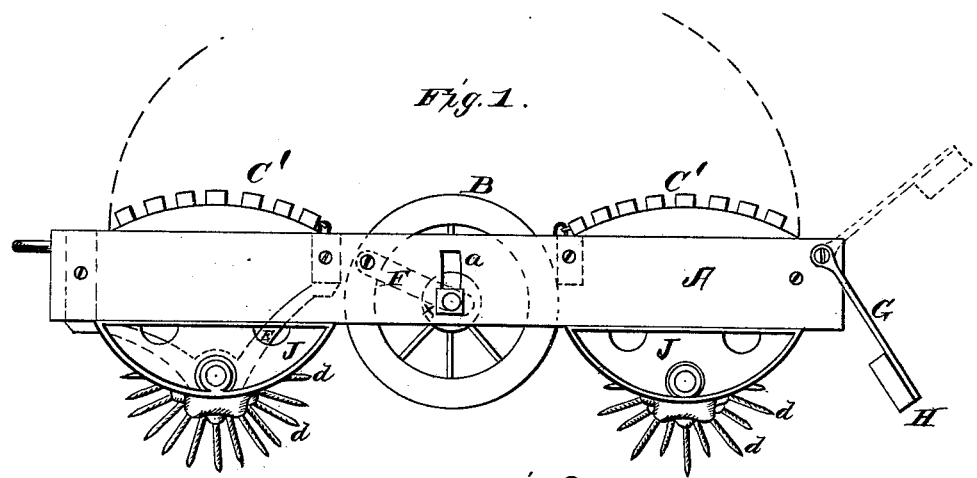
Figure 2:
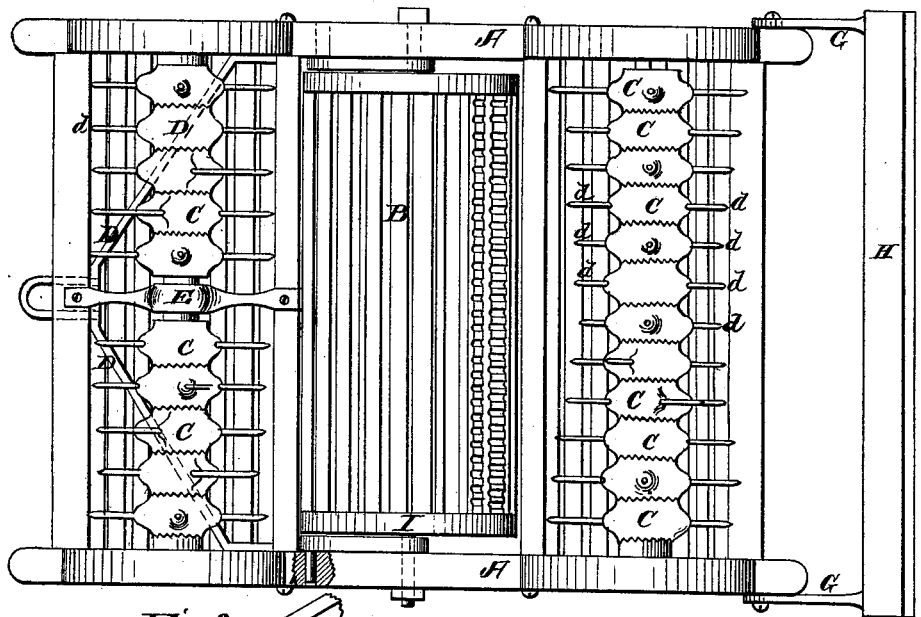
Figure 3:
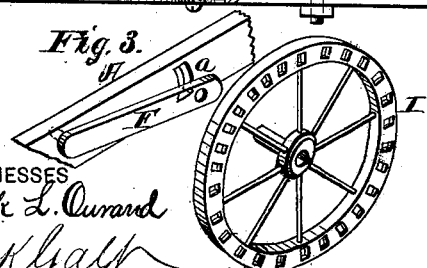

In the accompanying drawings, making a part of this specification, Figure 1 represents a side view; Fig. 2, a bottom view; and Fig. 3 a view of two detached portions.

In the figures, A represents a rectangular frame, made of suitable length and width to contain the rotating harrow shafts and pulverizer. B represents a cylindrical pulverizer, which is composed of two heads, I, which are cast with openings in them, to receive the ends of the slats which compose the periphery.

The slats may be placed close together or a little distance apart, and either made plain upon their faces or corrugated, as represented.

The shaft of this pulverizer or roller has its bearings in bars F, near one of their ends. The other ends of these bars are pivoted to the frame A.

The ends of the shaft pass through slots $a$ $a$ of the frame, so that the roller may be adjusted or regulated as to its height with reference to the frame and the harrow-rollers.

This pulverizer or roller is placed at or about the center of the frame.

The harrows, two in number, are made as follows: We take a shaft of suitable size and strength, and place upon it cast-iron sections or collars C C. The sides of these collars are serrated, so that when they are placed upon the shaft they fit snugly together, and cannot revolve upon the shaft separately.

The harrow-teeth $d$ $d$, which are made of steel, are either cast into the collar C or otherwise secured to them.

Each collar is provided with a number of teeth arranged as the radii of a circle. When a suitable number of the collars are placed upon the shaft they are secured in position either by means of a nut or a key, or other suitable device.

On the rear shaft it will be seen that all of the harrow-teeth are not of the same length. They shorten from each end toward the center. This is for the purpose of harrowing land which has been plowed in ridges or sections.

The front harrow-shaft is provided with two separate sections of collars. The said shaft is braced by a bracket, E, at its center, and on each side of this brace or bracket are the separate sections. The object of this is that when the rear harrow and the center roller are removed the machine can be used for cultivating crops which are planted in rows, the center of the harrow passing over the row.

D represents a brace in the front portion of the frame for strengthening it.

The ends of the harrow-shaft have their bearings in the metallic bearing-blocks J J. These blocks are secured to the frame separately, so that one or both of the harrows can be removed without changing the pieces of the frame.

H represents a drag or scraper, for leveling purposes, arranged at the rear end of the frame.

This scraper is secured to the arms G G, and the arms are secured to the frame.

C' C' represent two slotted covers, which are hinged at one side to the frame, and which serve to protect the harrows at their upper sides.

In drawing this implement over the ground the harrow-teeth pierce and break the clods of earth, while the roller B pulverizes, and the scraper H levels it.

We do not broadly claim a series of collars placed upon a shaft, and having cutters or teeth connected to the same.

Having thus fully described our invention, what we claim as new, and desire to secure by Letters Patent, is—

One or more harrows in a frame, formed of a series of collars, C C, having serrated faces, and arranged upon a shaft, said collars being provided with teeth $d\ d$, as and for the purpose set forth.

In testimony that we claim the foregoing we have hereunto set our hands.

ANTON SAUR.
JOHN WILSON.

Witnesses:
HENRY C. BARNETT,
R. M. MILLER.